May 15, 1923.
M. ELLRICH
FASTENING OF TRAYS TO CONVEYERS
Filed Nov. 5, 1920
1,455,434
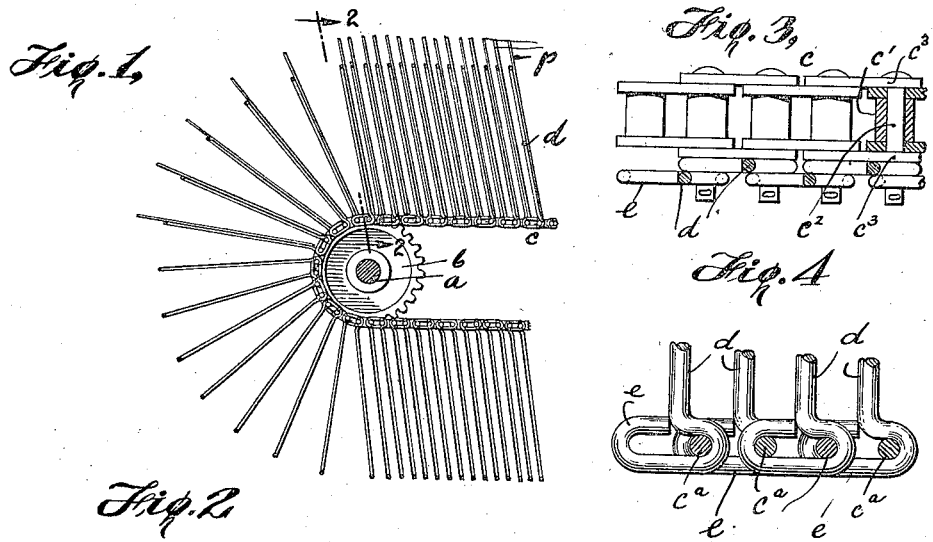
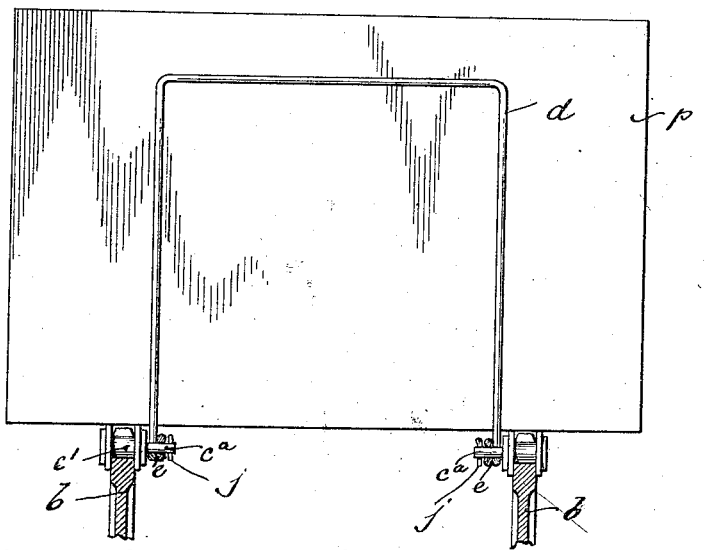
INVENTOR
Max Ellrich
BY
ATTORNEY Patented May 15, 1923.

1,455,434

UNITED STATES PATENT OFFICE.

MAX ELLRICH, OF JERSEY CITY, NEW JERSEY, ASSIGNOR, BY MESNE ASSIGNMENTS, TO MARIE CHRISTENSEN, OF BROOKLYN, NEW YORK.

FASTENING OF TRAYS TO CONVEYERS.

Application filed November 5, 1920. Serial No. 421,842.

*To all whom it may concern:*

Be it known that MAX ELLRICH, citizen of the German Republic, residing at 173 New York Avenue, Jersey City, in the county of Hudson and State of New Jersey, has invented certain new and useful Improvements in Fastening of Trays to Conveyers, of which the following is a specification.

The present invention relates to conveyers provided with wire trays, particularly to such which are generally used to convey printed or varnished tin plates through an oven for drying.

The object of my invention is to facilitate the fastening of the wire trays to roller chains of standard or short pitch without changing the construction of the chains.

According to some of the hitherto used methods, the fastening of trays to roller chains requires specially shaped links formed with recesses to secure the position of the wire trays. The work of substituting these special links for those already on the chain and the waste entailed thereby render such method greatly objectionable. Apart from that the links made to order invariably are of inferior quality and shorten the life of the conveyer.

According to another known method, the wire trays are fastened by passing their ends through holes drilled in the pins of the links, and inasmuch as the pins are of small diameter only holes of very small size can be drilled. The wire trays, therefore, must be made correspondingly thin so as to pass through said holes, which is objectionable because when the trays are thin they have a tendency to bend.

Their is still another method. According to this, special perforated studs are fixed between the links of the roller chains to receive the wire trays. But such studs can only be used with standard size chains. Chains of smaller pitch do not permit the use of such studs, as these in order to be strong must be of larger diameter than the pins of the links. The use of chains of large pitch links requires longer ovens.

In the accompanying drawing in which smaller reference characters denote corresponding parts, Fig. 1 is a cross section through one of the shafts of a chain conveyer equipped with trays fastened thereto according to my invention; Fig. 2 is an enlarged section on line 2—2 of Fig. 1 showing a tray fastened to the chain conveyer according to my method; Fig. 3 is a top plan view of a part of a chain conveyer and trays fastened thereto; Fig. 4 is an enlarged side elevation of the ends of wire trays fastened to the pins of the links, and Figs. 5 to 8 show modifications of curving the ends of the wire trays.

In the drawing $a$ denotes one of the shafts of the endless conveyer, $b$, the sprocket wheel and $c$ part of a roller chain engaging the sprocket wheel. Each link of the chain as usually comprises a roller $c'$, a pin $c^2$ and members $c^3$ connecting the pins of adjoining links. This construction of the chain is well known and does not form part of my invention.

The trays $d$ are usually made of wire bent in the shape of a U spanned between opposite links of the two parallel chains of the conveyer to radiate or project therefrom, and to serve as supports for the plates $p$ to be treated in the oven (not shown). My invention consists in the particular manner of fastening of the trays to the pins of the links so that they will be rigidly connected to the links and project at a suitable angle of inclination while traveling on tracks (not shown) and will swing open or spread apart when passing around the sprocket wheels, to permit the plates $p$ to be conveniently passed between two adjoining trays.

As has been stated, according to the hitherto used methods, changes were required on the standard made chains to enable such fastening which rendered said methods objectionable.

According to my invention the ends of each tray $d$ are looped around the inner ends $c^a$ of two adjoining pins $c^2$, so that the trays become rigidly secured to the links.

The bending of the ends around the pins may be effected in various ways. According to Fig. 4 each end of the wire tray $d$ is simply curved to form an oblong loop $e$ engaging around the inner ends $c^a$ of two adjoining pins $c^2$ of the chain, the extreme ends of the loop being loose but abutting against the body of the tray.

According to Fig. 5 the extreme end of the loop $f$ is bent parallel to the side of the tray and may be welded thereto.

According to Fig. 6, double closed loops $g$ may be formed by bending the lower ends of the tray as shown and welding the extreme end of said loop to the tray body.

Or the ends of the tray may be curved to form double loops $h$, $i$, as in Figs. 7 and 8 respectively.

The pins $c^2$ have their inner ends $c^a$ extended sufficiently to be engaged by two loops of adjoining trays. Cotter pins $j$ may be used to secure the loops in position on the pins $c^2$.

It will be seen that according to my invention the trays can be readily and easily attached to the chains without changing the latter in any manner, therey materially reducing the expense of such conveyers.

The mode of bending of the ends of the wire trays may be modified in various other ways from those shown without departing from the principle of my invention.

What I claim is:—

1. In a conveyer of the character described, the combination with a roller chain, of wire trays removably carried by said chain and the ends of which are looped around the ends of the pins of adjoining links.

2. In a conveyer of the character described, the combination with a roller chain, of wire trays removably carried by said chain and the ends of which are looped around the ends of the pins of adjoining links and means for preventing the loops from slipping off said pins.

3. In a conveyer of the character described, the combination with a roller chain, of a wire tray removably carried by said chain and the ends of which are curved around the ends of the pins of two adjoining links and welded to the body of the tray to form closed loops, and means for holding said loops in position on said pins.

In testimony whereof I affix my signature in presence of two witnesses.

MAX ELLRICH.

Witnesses:
JOSEPH T. McMAHAN,
S. W. CHRISTMUS.